(12) United States Patent
Ioannou et al.

(10) Patent No.: US 10,628,894 B1
(45) Date of Patent: Apr. 21, 2020

(54) METHOD AND SYSTEM FOR PROVIDING PERSONALIZED RESPONSES TO QUESTIONS RECEIVED FROM A USER OF AN ELECTRONIC TAX RETURN PREPARATION SYSTEM

(71) Applicant: Intuit Inc., Mountain View, CA (US)

(72) Inventors: Nikolaos Ioannou, San Diego, CA (US); Tristan C. Baker, San Diego, CA (US); Christopher Joel Gast, Poway, CA (US); Patricia Nations, Tucson, AZ (US)

(73) Assignee: Intuit Inc., Mountain View, CA (US)

( * ) Notice: Subject to any disclaimer, the term of this patent is extended or adjusted under 35 U.S.C. 154(b) by 684 days.

(21) Appl. No.: 14/608,039

(22) Filed: Jan. 28, 2015

(51) Int. Cl.
*G06Q 40/00* (2012.01)
(52) U.S. Cl.
CPC ................. *G06Q 40/123* (2013.12)
(58) Field of Classification Search
USPC ............ 705/31, 39, 40, 45, 37, 26; 715/708, 715/802, 776
See application file for complete search history.

(56) References Cited

U.S. PATENT DOCUMENTS

| | | | |
|---|---|---|---|
| 5,285,384 | A | 2/1994 | Gineris |
| 5,884,283 | A | 3/1999 | Manos |
| 6,021,397 | A | 2/2000 | Jones et al. |
| 6,401,080 | B1 | 6/2002 | Bigus et al. |
| 6,871,322 | B2 * | 3/2005 | Gusler ................. G06F 9/453 715/708 |
| 7,010,507 | B1 | 3/2006 | Anderson et al. |
| 7,181,438 | B1 | 2/2007 | Szabo |

(Continued)

FOREIGN PATENT DOCUMENTS

| | | |
|---|---|---|
| JP | 2002-099613 | 4/2002 |
| KR | 10-2009-0089225 | 8/2009 |

OTHER PUBLICATIONS

"Question & Answer Excerpt Regarding Microsoft Error Reports", dated Jan. 31, 2014; retrieved from the Internet Archive at https://superuser.com/questions/709161/what-happens-when-someone-sends-a-microsoft-error-report; retrieved from the internet Oct. 13, 2018.

(Continued)

*Primary Examiner* — Tien C Nguyen
(74) *Attorney, Agent, or Firm* — Paradice and Li LLP

(57) ABSTRACT

A method and system provides a personalized question response to a tax-related question that is received from a user of an electronic tax return preparation system, according to one embodiment. The method and system include receiving user data that is associated with the user of the electronic tax return preparation system, according to one embodiment. The method and system include monitoring interactions between the user and a user interface of the electronic tax return preparation system to determine user analytics, according to one embodiment. The method and system include receiving a tax-related question having question content, according to one embodiment. The method and system include determining a question response that satisfies the tax-related question, according to one embodiment. The method and system include providing the question response to the user through the user interface, according to one embodiment.

8 Claims, 5 Drawing Sheets

(56) References Cited

U.S. PATENT DOCUMENTS

| | | | |
|---|---|---|---|
| 7,240,297 B1* | 7/2007 | Anderson | G06F 3/0481 |
| | | | 715/802 |
| 7,539,635 B1 | 5/2009 | Peak et al. | |
| 7,590,572 B2 | 9/2009 | Larson | |
| 7,603,301 B1 | 10/2009 | Regan | |
| 7,610,226 B1 | 10/2009 | Miller | |
| 7,636,742 B1 | 12/2009 | Olavarrieta et al. | |
| 7,680,756 B2 | 3/2010 | Quinn et al. | |
| 7,685,034 B1 | 3/2010 | Mori et al. | |
| 7,693,769 B1 | 4/2010 | Burlison et al. | |
| 7,716,094 B1* | 5/2010 | Sutter | G06Q 20/14 |
| | | | 705/30 |
| 7,747,484 B2 | 6/2010 | Stanley et al. | |
| 7,769,647 B1 | 8/2010 | Char et al. | |
| 7,778,895 B1 | 8/2010 | Baxter et al. | |
| 7,818,222 B2 | 10/2010 | Allanson et al. | |
| 7,831,688 B2* | 11/2010 | Linyard | G06F 16/954 |
| | | | 709/218 |
| 7,836,406 B1 | 11/2010 | Kirsten et al. | |
| 7,848,971 B1 | 12/2010 | Mori et al. | |
| 7,849,405 B1* | 12/2010 | Coletta | G06F 9/453 |
| | | | 715/708 |
| 7,860,763 B1 | 12/2010 | Quinn et al. | |
| 7,904,356 B1 | 3/2011 | Cobarrubia | |
| 7,930,226 B1 | 4/2011 | Quinn et al. | |
| 7,945,522 B2 | 5/2011 | McGovern et al. | |
| 8,001,006 B1 | 8/2011 | Yu et al. | |
| 8,019,664 B1 | 9/2011 | Tifford et al. | |
| 8,024,660 B1 | 9/2011 | Quinn et al. | |
| 8,112,275 B2* | 2/2012 | Kennewick | G10L 15/22 |
| | | | 704/240 |
| 8,190,499 B1 | 5/2012 | McVickar | |
| 8,204,805 B2 | 6/2012 | Eftekhari et al. | |
| 8,224,726 B2* | 7/2012 | Murray | G06F 17/243 |
| | | | 705/19 |
| 8,346,635 B1 | 1/2013 | Olim | |
| 8,386,966 B1* | 2/2013 | Attinasi | G06F 11/3438 |
| | | | 379/93.01 |
| 8,407,113 B1 | 3/2013 | Eftekhari et al. | |
| 8,417,596 B1 | 4/2013 | Dunbar et al. | |
| 8,417,715 B1 | 4/2013 | Bruckhaus et al. | |
| 8,418,920 B2 | 4/2013 | Lieberman et al. | |
| 8,423,444 B1 | 4/2013 | Mackrell et al. | |
| 8,429,184 B2 | 4/2013 | Ismalon | |
| 8,433,627 B2 | 4/2013 | Agee et al. | |
| 8,447,667 B1 | 5/2013 | Dinamani et al. | |
| 8,452,676 B1 | 5/2013 | Talan et al. | |
| 8,458,058 B2 | 6/2013 | Kuchs et al. | |
| 8,492,999 B2 | 7/2013 | Cheng | |
| 8,606,665 B1 | 12/2013 | Shaw | |
| 8,635,127 B1 | 1/2014 | Shaw | |
| 8,656,273 B1 | 2/2014 | Tifford et al. | |
| 8,694,397 B2 | 4/2014 | Seubert et al. | |
| 8,719,120 B1 | 5/2014 | McVickar et al. | |
| 8,752,603 B2 | 6/2014 | Christ et al. | |
| 8,812,380 B2 | 8/2014 | Murray et al. | |
| 8,832,584 B1* | 9/2014 | Agarwal | G06F 3/0483 |
| | | | 715/776 |
| 8,857,713 B2 | 10/2014 | Lieberman et al. | |
| 8,874,731 B1 | 10/2014 | Puppin | |
| 8,903,810 B2 | 12/2014 | Ismalon | |
| 8,942,999 B1 | 1/2015 | Fernando et al. | |
| 9,037,962 B1 | 5/2015 | Vassar et al. | |
| 9,069,580 B2* | 6/2015 | Armstrong | G06F 3/04842 |
| 9,098,586 B1 | 8/2015 | Latif et al. | |
| 9,117,247 B2 | 8/2015 | Lieberman et al. | |
| 9,128,911 B1 | 9/2015 | Howe et al. | |
| 9,153,141 B1 | 10/2015 | Kane et al. | |
| 9,280,252 B1 | 3/2016 | Brandmaier et al. | |
| 9,286,282 B2 | 3/2016 | Ling et al. | |
| 9,330,415 B1 | 5/2016 | Castleman et al. | |
| 9,390,402 B1 | 7/2016 | Kane et al. | |
| 9,406,089 B2 | 8/2016 | Mori et al. | |
| 9,412,017 B1 | 8/2016 | Huang et al. | |
| 9,444,824 B1 | 9/2016 | Balazs et al. | |
| 9,582,757 B1* | 2/2017 | Holmes | G06N 5/04 |
| 9,886,725 B1 | 2/2018 | Bober et al. | |
| 9,911,160 B2 | 3/2018 | Lee et al. | |
| 9,916,626 B2 | 3/2018 | Huang et al. | |
| 9,916,627 B1 | 3/2018 | Huang et al. | |
| 9,959,560 B1 | 5/2018 | Whitaker et al. | |
| 9,990,678 B1 | 6/2018 | Cabrera et al. | |
| 10,096,072 B1 | 10/2018 | Ali et al. | |
| 10,140,666 B1 | 11/2018 | Wang et al. | |
| 10,169,828 B1 | 1/2019 | Morin et al. | |
| 10,204,382 B2 | 2/2019 | Morin et al. | |
| 2002/0052774 A1 | 5/2002 | Parker et al. | |
| 2002/0111888 A1 | 8/2002 | Stanley et al. | |
| 2002/0133394 A1 | 9/2002 | Bushey et al. | |
| 2003/0061131 A1 | 3/2003 | Parkan | |
| 2003/0169371 A1 | 9/2003 | Chiang et al. | |
| 2004/0078271 A1 | 4/2004 | Morano et al. | |
| 2004/0083145 A1 | 4/2004 | Kobayashi et al. | |
| 2005/0033735 A1 | 2/2005 | Shapiro | |
| 2005/0054381 A1 | 3/2005 | Lee et al. | |
| 2005/0144072 A1 | 6/2005 | Perkowski et al. | |
| 2005/0160103 A1 | 7/2005 | Raffo | |
| 2005/0210024 A1 | 9/2005 | Hurst-Hiller et al. | |
| 2005/0246234 A1 | 11/2005 | Munyon | |
| 2006/0075019 A1 | 4/2006 | Donovan et al. | |
| 2006/0085306 A1 | 4/2006 | Schulte et al. | |
| 2006/0085750 A1* | 4/2006 | Easton, Jr. | G06F 9/453 |
| | | | 715/708 |
| 2006/0122918 A1 | 6/2006 | Graboske et al. | |
| 2006/0155632 A1 | 7/2006 | Cherkas et al. | |
| 2006/0178961 A1 | 8/2006 | Stanley et al. | |
| 2006/0184410 A1 | 8/2006 | Ramamurthy et al. | |
| 2006/0271451 A1 | 11/2006 | Varughese | |
| 2007/0011039 A1 | 1/2007 | Oddo | |
| 2007/0033116 A1 | 2/2007 | Murray | |
| 2007/0033117 A1 | 2/2007 | Murray | |
| 2007/0226153 A1 | 9/2007 | Ziegler | |
| 2008/0027979 A1 | 1/2008 | Chandrasekar et al. | |
| 2008/0059900 A1 | 3/2008 | Murray et al. | |
| 2008/0104045 A1 | 5/2008 | Cohen et al. | |
| 2008/0119134 A1 | 5/2008 | Rao | |
| 2008/0147494 A1 | 6/2008 | Larson | |
| 2008/0189197 A1 | 8/2008 | Allanson et al. | |
| 2008/0201206 A1 | 8/2008 | Pokorney et al. | |
| 2008/0263643 A1 | 10/2008 | Jaiswal et al. | |
| 2009/0076335 A1 | 3/2009 | Schwarzberg et al. | |
| 2009/0099959 A1 | 4/2009 | Liao et al. | |
| 2009/0307159 A1 | 12/2009 | Pinckney et al. | |
| 2010/0010849 A1 | 1/2010 | Hurd | |
| 2010/0017348 A1 | 1/2010 | Pinckney et al. | |
| 2010/0023934 A1 | 1/2010 | Sheehan et al. | |
| 2010/0063975 A1 | 3/2010 | Hayes | |
| 2010/0262495 A1 | 10/2010 | Dumon et al. | |
| 2010/0277429 A1 | 11/2010 | Day et al. | |
| 2010/0332362 A1 | 12/2010 | Ramsey et al. | |
| 2011/0004537 A1 | 1/2011 | Allanson et al. | |
| 2011/0078066 A1 | 3/2011 | Sherman et al. | |
| 2011/0119264 A1 | 5/2011 | Hu et al. | |
| 2011/0137776 A1 | 6/2011 | Goad et al. | |
| 2011/0173116 A1 | 7/2011 | Yan et al. | |
| 2011/0264569 A1 | 10/2011 | Houseworth et al. | |
| 2011/0307331 A1* | 12/2011 | Richard | G06Q 30/00 |
| | | | 705/14.45 |
| 2012/0030159 A1 | 2/2012 | Pilaszy et al. | |
| 2012/0030767 A1 | 2/2012 | Rippert et al. | |
| 2012/0053965 A1 | 3/2012 | Hellman et al. | |
| 2012/0084185 A1 | 4/2012 | Ciaramitaro et al. | |
| 2012/0084293 A1* | 4/2012 | Brown | G06F 3/048 |
| | | | 707/741 |
| 2012/0109792 A1 | 5/2012 | Eftekhari et al. | |
| 2012/0136764 A1 | 5/2012 | Miller et al. | |
| 2012/0211561 A1 | 8/2012 | Lieberman et al. | |
| 2012/0215669 A1 | 8/2012 | Lieberman et al. | |
| 2012/0278179 A1 | 11/2012 | Ray et al. | |
| 2012/0303495 A1 | 11/2012 | Murray | |
| 2012/0324393 A1 | 12/2012 | Mbenkum et al. | |
| 2013/0080302 A1 | 3/2013 | Allanson et al. | |
| 2013/0091050 A1 | 4/2013 | Merrill et al. | |

(56) References Cited

U.S. PATENT DOCUMENTS

| | | |
|---|---|---|
| 2013/0103420 A1 | 4/2013 | Massoumi et al. |
| 2013/0124644 A1 | 5/2013 | Hunt et al. |
| 2013/0198047 A1 | 8/2013 | Houseworth et al. |
| 2013/0254151 A1 | 9/2013 | Mohagheghi et al. |
| 2013/0282733 A1 | 10/2013 | Tawakol et al. |
| 2013/0317957 A1 | 11/2013 | Reahard et al. |
| 2014/0027509 A1 | 1/2014 | Lieberman et al. |
| 2014/0058910 A1 | 2/2014 | Abeles |
| 2014/0074672 A1 | 3/2014 | Sarver |
| 2014/0075014 A1 | 3/2014 | Chourey |
| 2014/0101571 A1 | 4/2014 | Lewis |
| 2014/0156566 A1 | 6/2014 | Kabiljo et al. |
| 2014/0172656 A1 | 6/2014 | Shaw |
| 2014/0180883 A1 | 6/2014 | Regan |
| 2014/0195461 A1 | 7/2014 | Fafard et al. |
| 2014/0201045 A1 | 7/2014 | Pai et al. |
| 2014/0207634 A1 | 7/2014 | Edmonds |
| 2014/0214636 A1 | 7/2014 | Rajsky |
| 2014/0222702 A1 | 8/2014 | Jennings |
| 2014/0244455 A1 | 8/2014 | Huang et al. |
| 2014/0244456 A1 | 8/2014 | Huang et al. |
| 2014/0244457 A1 | 8/2014 | Howell et al. |
| 2014/0279190 A1 | 9/2014 | Severinghaus et al. |
| 2014/0279720 A1 | 9/2014 | Bhatia et al. |
| 2014/0314225 A1 | 10/2014 | Riahi et al. |
| 2014/0324648 A1 | 10/2014 | Mori et al. |
| 2014/0325664 A1 | 10/2014 | Nekhoroshev |
| 2014/0337189 A1 | 11/2014 | Barsade et al. |
| 2014/0337527 A1 | 11/2014 | Jain |
| 2014/0337753 A1 | 11/2014 | McKellar et al. |
| 2014/0380179 A1 | 12/2014 | Bose et al. |
| 2015/0007065 A1 | 1/2015 | Krishnamoorthy et al. |
| 2015/0020091 A1 | 1/2015 | Roberts et al. |
| 2015/0026146 A1 | 1/2015 | Mance |
| 2015/0058188 A1 | 2/2015 | Bartlett et al. |
| 2015/0099255 A1 | 4/2015 | Asian et al. |
| 2015/0112767 A1 | 4/2015 | Shatzkamer et al. |
| 2015/0127813 A1* | 5/2015 | Li .................... H04L 67/22 709/224 |
| 2015/0149877 A1 | 5/2015 | Ling et al. |
| 2015/0178371 A1 | 6/2015 | Seth et al. |
| 2015/0261859 A1 | 9/2015 | Isensee et al. |
| 2015/0332167 A1 | 11/2015 | Kaushal et al. |
| 2015/0363875 A1 | 12/2015 | Guerry |
| 2016/0034853 A1 | 2/2016 | Wang et al. |
| 2016/0063643 A1 | 3/2016 | Martin |
| 2016/0063645 A1 | 3/2016 | Houseworth et al. |
| 2016/0078567 A1 | 3/2016 | Goldman et al. |
| 2016/0092994 A1 | 3/2016 | Roebuck et al. |
| 2016/0098804 A1 | 4/2016 | Mascaro et al. |
| 2016/0125552 A1 | 5/2016 | Pathak et al. |
| 2016/0148322 A1 | 5/2016 | Mascaro et al. |
| 2016/0180470 A1 | 6/2016 | Mascaro et al. |
| 2016/0217533 A1 | 7/2016 | Laaser |
| 2016/0217534 A1 | 7/2016 | Goldman et al. |
| 2016/0246762 A1 | 8/2016 | Eaton |
| 2016/0247239 A1 | 8/2016 | Houseworth et al. |
| 2016/0275627 A1 | 9/2016 | Wang et al. |
| 2016/0292217 A1 | 10/2016 | Sinha et al. |
| 2016/0306846 A1 | 10/2016 | Adams, Jr. et al. |
| 2016/0328804 A1 | 11/2016 | Mori et al. |
| 2016/0328805 A1 | 11/2016 | Mori et al. |
| 2016/0328806 A1 | 11/2016 | Mori et al. |
| 2016/0350870 A1 | 12/2016 | Morin et al. |
| 2016/0364806 A1 | 12/2016 | Lee |
| 2017/0004585 A1 | 1/2017 | Dang et al. |
| 2017/0132314 A1 | 5/2017 | Liu et al. |
| 2017/0147925 A1 | 5/2017 | Bostick et al. |

OTHER PUBLICATIONS

Zhang, Zhenya, et al.; "Enabling Personalization Recommendation with WeightedFP for Text Information Retrieval Based on User-Focus," Proceedings of the International Conference on Information Technology: Coding and Computing (ITCC'04), 5 pp.

Forsati, R.; "Web Page Personalization Based on Weighted Association Rules," 2009 International Conference on Electronic Computer Technology, pp. 130-135.

Anders, B. Susan; "Website of the Month: MSN Money Tax Center," Apr. 2013, The CPA Journal, pp. 72-73.

U.S. Appl. No. 60/608,035, filed Sep. 7, 2004, Quinn et al.

Publication 559: Final Income Tax Return for Decedent—Form 1040, p. 2, paragraph 2; https://taxmap.ntis.gov/taxmap/pub/p559-001.htm; retrieved from the Internet Jul. 11, 2017.

"Modular Programming," Wikipedia, the free encyclopedia, Jul. 29, 2014, http://en.wikipedia.org/w/index.php?title=Modular_programming&oldid=618953117, retrieved from the Internet on Mar. 31, 2015, 4 pages.

Laaser et al., "Method and System for Applying Predictive Models to Reduce Task Abandonment by a User," U.S. Appl. No. 14/529,317, filed Oct. 31, 2014.

Laaser et al., "Identification of Electronic Tax Return Errors Based on Declarative Constraints," U.S. Appl. No. 14/530,305, filed Oct. 31, 2014.

Goldman et al., "Predictive Model Based Identification of Potential Errors in Electronic Tax Return," U.S. Appl. No. 14/530,369, filed Oct. 31, 2014.

Laaser et al., "Method and System for Identifying Product Defects Within a Tax Return Preparation System," U.S. Appl. No. 14/607,935, filed Jan. 28, 2015.

Laaser et al., "Method and System for Assisting Tax Return Preparers with the Preparation of Tax Returns for Client Tax Filers," U.S. Appl. No. 14/634,219, filed Feb. 27, 2015.

Cabrera et al., "Method and System for Providing a Personalized Recommendation for a Tax Return Preparer," U.S. Appl. No. 14/670,986, filed Mar. 27, 2015.

Laaser et al., "Methods, Systems and Computer Program Products for Calculating an Estimated Result of a Tax Return," U.S. Appl. No. 14/674,582, filed Mar. 31, 2015.

Laaser et al., "Systems for Identifying Abandonment Indicators for an Electronic Tax Return Preparation Program," U.S. Appl. No. 14/698,645, filed Apr. 28, 2015.

\* cited by examiner

METHOD AND SYSTEM FOR PROVIDING PERSONALIZED RESPONSES TO QUESTIONS RECEIVED FROM A USER OF AN ELECTRONIC TAX RETURN PREPARATION SYSTEM

BACKGROUND

Federal and State Tax law has become so complex that it is now estimated that each year Americans alone use over 6 billion personal hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems are, by design, fairly generic in nature and often lack the malleability to meet the specific needs of a given user.

For instance, traditional tax return preparation systems have employed generic techniques for answering questions from potential customers regarding the tax return preparation process. If a user submits a query regarding, for example, deductions, traditional tax return preparations systems provide rules or instructions that cause the user to have to invest additional time to determine the answer to his/her question. The traditional tax return systems regurgitate tax law that states the various criteria needed to qualify for one or more particular deductions, and leaves the analysis of the user's personal information to the user. In other words, the onus was on the potential customer to reflect on their financial state, the status of their tax return, and the tax rules to determine the answer to their question.

The impersonal techniques employed by traditional electronic tax return preparation systems result in losses of significant numbers of potential customers each year because the tax return preparation systems appear to inadequately answer the potential customers' questions. As a result, the service providers of the traditional tax return preparation systems lose both the dissatisfied potential customers, in addition to losing potential referrals that may have originated from a satisfactory experience for the lost potential customers.

What is needed is a method and system for providing personalized responses to questions received from a user of an electronic tax return preparation system.

SUMMARY

Embodiments of the present disclosure address some of the shortcomings associated with traditional tax return preparation systems by providing personalized responses to questions received from a user of an electronic tax return preparation system. In one embodiment, a tax return preparation system provides personalized responses to questions based on question content, user data, analytics data collected about the user, and/or service provider content, in order to provide more direct or concise answers to questions. Examples of questions include, but are not limited to whether something is deductible, when will a refund arrive, and which button to click to print a form. In other words, the tax return preparation system leverages received question content, customer data, analytics data, and/or other knowledge content to deliver personalized responses (e.g., the best possible response) to users based on information that is related to the user, according to one embodiment. Because the tax return preparation system provides personalized answers based on the situation, characteristics, and/or information received for each user, the tax return preparation system provides different question responses to different users having the same question, according to various embodiments.

In one embodiment, a user submits a question to the tax return preparation system, in response to receiving mail from IRS. The user logs into the tax return preparation system to ask how to amend a tax return, and the tax return preparation system provides a question response with a template that: identifies the user; provides a status of the user's tax filing; and provides further instructions for the user (e.g., wait until the IRS completes processing of the submitted tax return), according to one embodiment.

In one embodiment, a user submits a question to the tax return preparation system, and the tax return preparation system instructs the user to log into the tax return preparation system to receive human resource-based user assistance. In one embodiment, the human resource-based user assistance includes providing a telephone number for the user to dial, or includes the initiation of a web-based chat with human resources in a work group that is associated with the user's question.

The tax return preparation system can be configured to employ a number of techniques to generate and provide personalized question responses, according to one embodiment. For example, the personalized question responses can include templates responses, which are populated with the user's information and with a specific date, mailing address, website, instruction, and/or notice that addresses the user's question. In one embodiment, each question response includes user data, question content, instructions, crowd source responses to similar questions, and/or other instructional publications associated with the user's question. As another example, the personalized question responses can include, but are not limited to, automatically calling the user, providing a telephone number to the user, establishing a web-based conversation (e.g., with a web chat dialog box), or providing some other type of human resource assistance to the user, according to one embodiment.

The tax return preparation system provides the template response and/or the human resource user assistance at least partially based on logic and/or rules established for the benefit of the service provider, according to one embodiment. For example, the tax return preparation system determines the likelihood of converting a potential customer to a paying customer, based on business-related rules or estimated benefit to the tax return preparation service provider, according to one embodiment.

The tax return preparation system uses a variety of response selection parameters to select a particular response to deliver to a user, in response to receipt of a question from the user, according to one embodiment. The response selection parameters include, but are not limited to, the question content submitted, the type of question, the tax topic associated with question, the product being used by the user, whether the user is logged into the tax return preparation system, when the user last logged into the tax return preparation system, if the user has ever logged into the tax return preparation system, clickstream data, duration on a webpage, navigation history between webpages, filing status of the user's tax return, and other user data according to one embodiment.

In one embodiment, the tax return preparation system utilizes regular logic expressions to analyze received questions and to determine which category of responses the question is associated with. Each category represents a set or group of question responses (e.g., template responses) that are similarly related in a data organizational structure, according to one embodiment. Examples of categories include, but are not limited to, print current year, amend current year, and electronic file ("e-file") status.

In one embodiment, the tax return preparation system receives feedback from the user and quantifies the effectiveness of the analysis performed by the tax return preparation system, based on the received feedback.

According to one embodiment the tax return preparation system repeatedly applies rules, logic, and/or filters to question content to direct a user's question to one of a number of predetermined template responses. In one embodiment, a template response includes a sequence of user interfaces configured to gather additional information from the user and guide the user to a personalized question response. In some embodiments, the question response includes notifying the user that the user needs to wait for additional correspondence from the IRS while the user's tax return filing is being processed.

In one embodiment, the tax return preparation system uses the acquired information from the user to provide assistance to the user before the assistance is requested from the user. For example, after providing a response to a question, the tax return preparation system can be configured to direct the user to the next logical response, response category, or topic that succeeds the user's present question/response/task, in order to preemptively provide assistance (e.g., before the assistance has even been requested), according to one embodiment.

In one embodiment, the tax return preparation system prioritizes the tax topics within the tax return preparation system by relevance to the user. The tax return preparation system evaluates the user data and/or user analytics to prioritize the tax topics, according to one embodiment. The tax return preparation system then evaluates the question content, user data, user analytics, and/or available response content in combination with the prioritized tax topics to generate a response that is personalized to a particular user, according to one embodiment.

According to one embodiment, the tax return preparation system advantageously generates more satisfactory question responses than traditional tax return preparation systems, without having to handcraft responses to every possible permutation of questions that might arise in the course of the tax return preparation interview.

Embodiments of the present disclosure address some of the shortcomings associated with traditional tax return preparation systems by providing personalized responses to questions received from a user of an electronic tax return preparation system. The various embodiments of the disclosure can be implemented to improve the technical fields of user experience, automated/electronic tax return preparation, data collection, and data processing. Therefore, the various described embodiments of the disclosure and their associated benefits amount to significantly more than an abstract idea. In particular, by evaluating a user's question in context of user data, user analytics, and various other user-related parameters, a tax return preparation system/application may be able to provide a more accurate response to a user's question and thereby retain the user's loyalty as a customer of the tax return preparation system, according to one embodiment. Furthermore, by providing accurate, direct, and/or explicit instructions to the user in response to the user's question, the tax return preparation system may save the user time and may reduce user consumption of service provider human resources, according to one embodiment.

Additionally, by reducing the processing and presentation of irrelevant question responses to a user, implementation of embodiments of the present disclosure allows for significant improvement to the field of data collection and data processing. As one illustrative example, by minimizing, or potentially eliminating, the processing and presentation of irrelevant question responses to a user, implementation of embodiments of the present disclosure allows for relevant data collection using fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

Figure 1:
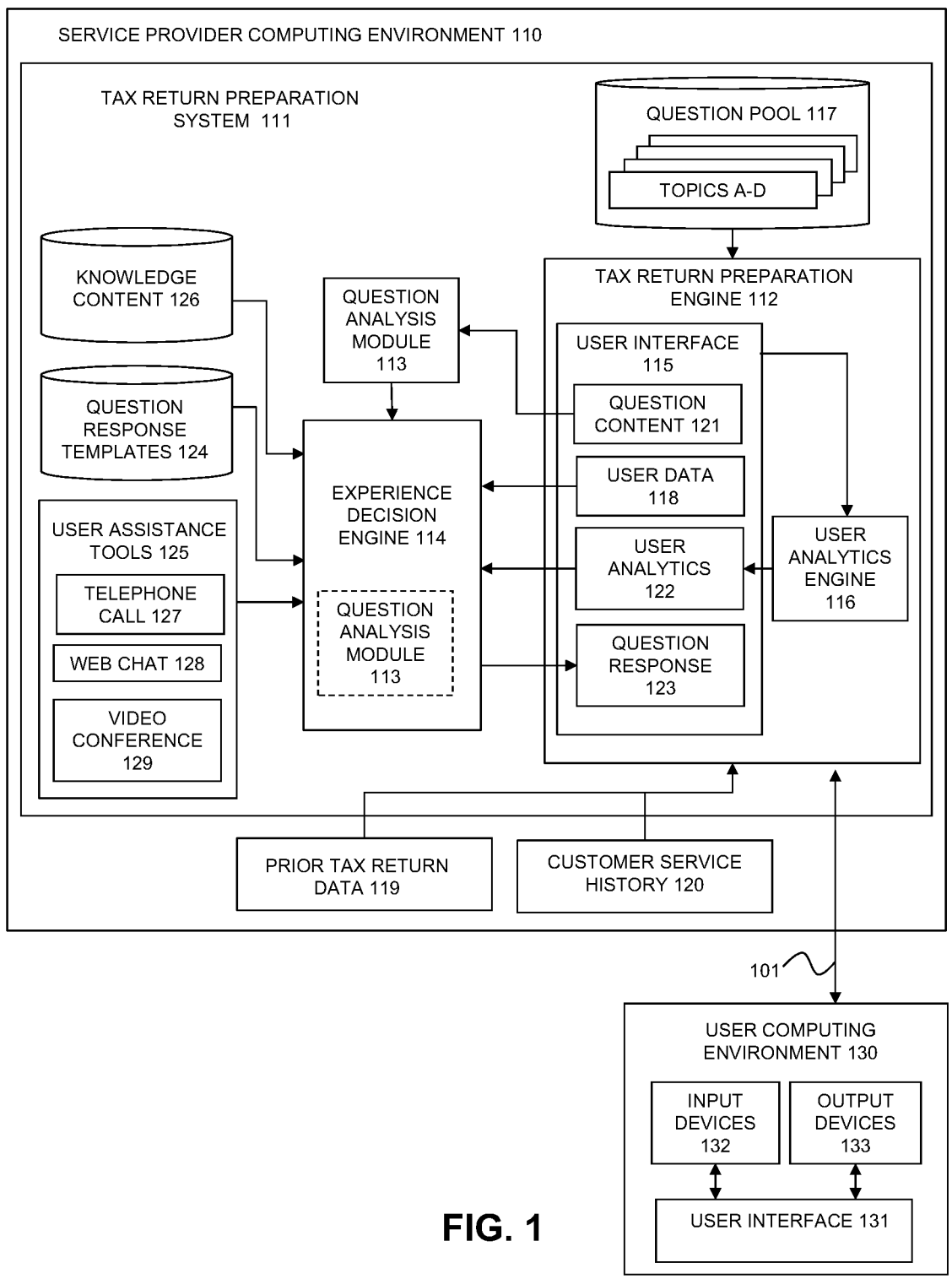
FIG. 1 is a block diagram of software architecture for providing personalized question responses to user questions received within a tax return preparation system, in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein describe systems and processes suitable for providing personalized question responses to user questions received within a tax return preparation system, by basing the question responses on question content, user data, and/or user analytics, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "user experience" includes not only the interview process, interview process questioning, and interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Hardware Architecture

FIG. 1 illustrates a block diagram of a production environment 100 that provides personalized question responses to user questions received within a tax return preparation system, by basing the question responses on question content, user data, and/or user analytics, according to one embodiment. The production environment 100 provides personalized question responses by receiving question content from a user, analyzing the question content, monitoring user analytics, determining whether a template response satisfies/addresses the question content, and/or determining whether to provide human resource-based user assistance to respond to the user's question, according to one embodiment. Various additional embodiments are disclosed below in the context of the tax return preparation system.

Traditional tax return preparation systems have several weaknesses, when it comes to responding to users' questions. For instance, traditional tax return preparation systems employ generic techniques for answering users' questions that concern the tax return preparation process. If a user submits a query regarding, for example, deductions, traditional tax return preparations systems provide rules or instructions that cause the user to have to invest additional time to determine the answer to his/her question. The traditional tax return systems regurgitate tax law that states the various criteria needed to qualify for one or more particular deductions, and leaves the analysis of the user's personal information to the user. In other words, traditional tax return systems leave the onus on the potential customer to reflect on their financial state, the status of their tax return, and the tax rules to determine the answer to their question.

The impersonal techniques employed by traditional electronic tax return preparation systems result in losses of significant numbers of potential customers each year because the tax return preparation systems appear to inadequately answer the potential customers' questions. As a result, the service providers of the traditional tax return preparation systems lose both the dissatisfied potential customers, in addition to losing potential referrals that may have originated from a satisfactory experience for the lost potential customers.

As one illustrative example, a user who is an employee is likely to need a different tax form (e.g., a W-2) to prepare her taxes than the tax form (e.g., a 1099) that her counterpart needs who is an independent contractor or small business owner. Traditionally, a professional tax return specialist was needed to adjust the nature of question responses provided in an interview, based on specific facts obtained from the user during the onset of the interview. However, an electronic tax return preparation system can be configured to provide faster, more accurate, and more readily available services than a professional tax return specialists because, for example, a professional tax return specialist may have limited hours of operation, may operate in locations that are inconvenient to some taxpayers who have inflexible work schedules, and may be prone to error during the busy tax return preparation season.

Embodiments of the present disclosure address some of the shortcomings associated with traditional tax return preparation systems by providing personalized responses to questions received from a user of an electronic tax return preparation system. The various embodiments of the disclosure can be implemented to improve the technical fields of user experience, automated/electronic tax return preparation, data collection, and data processing. Therefore, the various described embodiments of the disclosure and their associated benefits amount to significantly more than an abstract idea. In particular, by evaluating a user's question in context of user data, user analytics, and various other user-related parameters, a tax return preparation system/application may be able to provide a more accurate response to a user's question and thereby retain the user's loyalty as a customer of the tax return preparation system, according to one embodiment. Furthermore, by providing accurate, direct, and/or explicit instructions to the user in response to the user's question, the tax return preparation system may save the user time and may reduce user consumption of service provider human resources, according to one embodiment.

In addition, as noted above, by minimizing, or potentially eliminating, the processing and presentation of irrelevant question responses to a user, implementation of embodiments of the present disclosure allows for significant improvement to the field of data collection and data processing. As one illustrative example, by minimizing, or potentially eliminating, the processing and presentation of irrelevant question responses to a user, implementation of embodiments of the present disclosure allows for relevant data collection using fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

The production environment 100 includes a service provider computing environment 110 and a user computing environment 130 for providing personalized question responses to questions received from a user, to support the operation of an electronic tax return preparation system, according to one embodiment. The computing environments 110 and 130 are communicatively coupled to each other with a communication channel 101 over one or more communications networks, according to one embodiment.

The service provider computing environment 110 represents one or more computing systems such as a server, a computing cabinet, and/or distribution center that is configured to receive, execute, and host one or more tax return preparation systems (e.g., applications) for access by one or more users, e.g., tax filers and/or system administrators, according to one embodiment.

The service provider computing environment 110 includes a tax return preparation system 111 that is configured receive and evaluate the content of a question (hereafter, "question content"), user data, and user analytics to provide a personalized question response to a user, in response to receipt of a question from the user with the tax return preparation system 111, according to one embodiment. The tax return preparation system 111 includes various components, databases, engines, modules, and/or data to support the generation and delivery of personalized question responses to users, according to various embodiments.

The tax return preparation system 111 includes a tax return preparation engine 112, a question analysis module 113, and an experience decision engine 114, to provide personalized question responses to users of the tax return preparation system 111, according to one embodiment.

The tax return preparation engine 112 guides the user through the tax return preparation process and is configured to receive and response to user questions, according to one embodiment. The tax return preparation engine 112 includes a user interface 115 and a user analytics engine 116, according to one embodiment. The user interface 115 includes one or more user experience elements and graphical user interface tools, such as, but not limited to, buttons, slides, dialog boxes, text boxes, drop-down menus, banners, tabs, directory trees, links, audio content, video content, and/or other multimedia content for transmitting tax questions from a question pool 117 to the user and for receiving user data 118 from the user, according to one embodiment. The question pool 117 includes tax questions covering any tax topics, e.g., tax topics A-D, that are relevant to progressing a user through the tax return preparation interview, according to one embodiment. The user data 118 includes any information received from the user through the user interface 115, according to one embodiment. The user data 118 can include, but is not limited to, a name, a Social Security number, a government identification, a driver's license number, a date of birth, an address, a zip code, home ownership status, marital status, annual income, W-2 income, a job title, an employer's address, spousal information, children's information, asset information, medical history, occupation, website browsing preferences, a typical lingering duration on a website, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, for the electronic preparation of a user's tax return, according to various embodiments.

The user data 118 also includes information that may be indirectly related to a particular tax return preparation interview, according to one embodiment. For example, the tax return preparation engine 112 can be configured to receive prior tax return data 119 and/or customer service history 120 from the service provider computing environment 110, according to one embodiment. The tax return preparation engine 112 can be configured to incorporate or integrate the prior tax return data 119 and/or the customer service history 120 into the user data 118 according to one embodiment. The prior tax return data 119 is tax return data that is associated with the user from previous years' tax returns, according to one embodiment. The customer service history 120 is information associated with one or more previous interactions between a user and the customer service for the service provider, e.g., a help desk or other human resources, according to one embodiment. Thus, the user data 118 may include information in addition to data acquired directly from the user during the course of a particular tax return preparation interview, according to one embodiment.

The user interface 115 also receives question content 121, determines user analytics 122, and transmits a question response 123 to the user, according to one embodiment. The question content 121 represents the contents of one or more questions submitted by the user to the tax return preparation system 111, according to one embodiment. The user analytics 122 includes various analytic information associated with a user's virtual interaction with the tax return preparation system 111, according to one embodiment. The user analytics engine 116 monitors user's reading, browsing, and/or other navigation through one or more user interfaces of the tax return preparation system 111, according to one embodiment. The user analytics engine 116 generates the user analytics 122 in response to the monitoring of the user's navigation, according to one embodiment. The user analytics 122 can include, but is not limited to, mouse-over information, durations for entering responses to questions, the product being used by the user, whether the user is logged into the tax return preparation system, when the user last logged into the tax return preparation system, if the user has ever logged into the tax return preparation system, duration on a webpage, navigation history between webpages, other clickstream data, Internet Protocol ("IP") address, and/or operating system, according to various embodiments.

As discussed below, the user interface 115 transmits the question response 123 to the user to address, satisfy, and/or answer the question content 121 (e.g., a question) that is submitted by a user, according to one embodiment. The question response 123 includes, but is not limited to, one or more templates responses that are populated with the user's information and with a specific date, mailing address, website, instruction, and/or notice that addresses the user's question. In one embodiment, each question response 123 includes the user data 118, the question content 121, instructions, crowd source responses to similar questions, and/or other instructional publications associated with the user's question. As another example, the question responses 123 can include, but are not limited to, telephonically calling the user, providing a telephone number to the user, establishing a web-based conversation with the user (e.g., with a web chat dialog box), or providing some other type of human resource assistance to the user, according to various embodiments.

The tax return preparation engine 112 employs the user interface 115 to transmit and receive information with the user computing environment 130 via a user interface 131, according to one embodiment. The tax return preparation engine 112 employs the user interface 115 to receive the question content 121 and the user data 118 from input devices 132 of the user computing environment 130, and employs the user interface 115 to transmit the question response 123 to output devices 133 of the user computing environment 130, according to one embodiment.

The question analysis module 113 analyzes the question content 121 to translate the received user's question into phrases, terms, and/or words that can be used by the experience decision engine 114 to determine a personalized question response for the user, according to one embodiment. The question analysis module 113 can be configured to include a third party analytics platform, such as one available from Clarabridge® or another intelligence analytics service provider, according to one embodiment. The question analysis module 113 parses or reduces the question content 121 or the received question into the phrases, terms, and/or words that represent the substantive purpose or point of the question, according to one embodiment. In one embodiment, the question analysis module 113 is configured to determine a tax topic or a tax category to which the question content 121 belongs or is associated. In another embodiment, the question analysis module 113 is optionally integrated into the experience decision engine 114, and performs analytic functions as a subset of functions that are performed by the experience decision engine.

The experience decision engine 114 provides the question response 123, which has been personalized to the user, based on one or more of the question content 121, the user data 118, and the user analytics 122, according to one embodiment. In one embodiment, the experience decision engine 114 provides personalized responses to user questions in order to provide more direct or concise answers or end-solutions to users' questions in a way that differs from traditional tax return preparation systems that rotely regurgitate tax law and leave users to struggle through their own tax analyses. Examples of user questions include, but are not limited to whether something is deductible, when will a refund arrive, and which button should be clicked to print a form. In other words, the experience decision engine 114 leverages received question content 121, the user data 118, and the user analytics 122 to deliver personalized responses (e.g., the best possible response) to users based on information that is related to the user, according to one embodiment. Because the experience decision engine 114 provides personalized answers based on the situation, characteristics, and/or information received for each user, the experience decision engine 114 sometimes provides different question responses to different users, even when the different users submit the same question (e.g., directs a user to a W-2 form instead of a 1099 form, or vice-versa), according to various embodiments.

The experience decision engine 114 can be configured to employ a number of techniques to generate and provide the personalized question response 123, according to one embodiment. For example, the experience decision engine 114 can generate the personalized question response 123 to include, but not be limited to, one or more question response templates 124, according to one embodiment. Each of the question response templates 124 is populated with the user data 118 and with a specific date, mailing address, website, instruction, and/or notice that addresses the user's question. In one embodiment, the experience decision engine 114 generates the question response 123 by selecting one of the question response templates 124 based on user-specific parameters and by populating the selected question response template 124 with the user data 118, the question content 121, instructions, crowd source responses to similar questions, and/or other instructional publications associated with the user's question.

In one embodiment, the experience decision engine 114 at least partially populates one of the question response templates 124 with information from the knowledge content 126, according to one embodiment. The knowledge content 126 include crowd source responses that are generated by other users or administrators of the tax return preparation system 111, according to one embodiment. The knowledge content 126 includes professional publications related to specific tax questions or tax topics, and the professional publications are written by tax professionals or service provider employees, according to one embodiment. In one embodiment, populating a question response template 124 includes acquiring additional information from the user prior to providing a finalized answer to a question.

As another example, the experience decision engine 114 can generate the personalized question response 123 to include, but not be limited to, one of a number of user assistance tools 125, according to one embodiment. The user assistance tool 125 include human resource assistance tools including, but not limited to, a telephone call 127, a web chat 128, and a video conference 129, according to one embodiment. Accordingly, the experience decision engine 114 in configured to generate the personalized question response 123 by automatically calling the user, providing a telephone number to the user, establishing a web-based conversation with the user (e.g., with a web chat dialog box), or providing some other type of human resource assistance to the user, according to one embodiment. By connecting the user with human resource assistance, the tax return preparation system 111 can compensate for particular shortcomings of the user, e.g., inability to follow instructions, weak reading comprehension, and/or weak computer skills, according to one embodiment. In one embodiment, the experience decision engine 114 provides human resource user assistance if the question response templates 124 inadequately match or relate to the question content 121. In one embodiment, the experience decision engine 114 provides human resource user assistance to a user, only after first providing a closest related question response template 124 to the user for consideration. In another embodiment, the experience decision engine 114 provides human resource user assistance instead of initially providing a question response template 124 to the user.

The experience decision engine 114 provides the question response templates 124 and/or the user assistance tools 125 at least partially based on logic and/or rules established for the benefit of the service provider, according to one embodiment. For example, the experience decision engine 114 provides user assistance tools 125 in addition to or in lieu of the question response templates 124, after first having determined the likelihood of converting a potential customer to a paying customer, based on business-related rules or an estimated benefit to the service provider, according to one embodiment.

The experience decision engine 114 uses a variety of response selection parameters to generate a personalized question response 123 to deliver to a user, according to one embodiment. The response selection parameters include, but are not limited to, the question content submitted, the type of question, the tax topic associated with question, the product being used by the user, whether the user is logged into the tax return preparation system, when the user last logged into the tax return preparation system, if the user has ever logged into the tax return preparation system, clickstream data, duration on a webpage, navigation history between webpages, and filing status of the user's tax return, according to one embodiment. The response selection parameters also include various types of user data 118 stored or received by the tax return preparation system 111, according to one embodiment. The response selection parameters further include, but are not limited to, a name, a Social Security number, a government identification, a driver's license number, a date of birth, an address, a zip code, home ownership status, marital status, annual income, W-2 income, a job title, an employer's address, spousal information, children's information, asset information, medical history, occupation, website browsing preferences, a typical lingering duration on a website, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, for the electronic preparation of a user's tax return, according to various embodiments.

In one embodiment, the tax return preparation system 111 and the experience decision engine 114 has the capacity to increase in complexity to match question response templates 124 to question content 121, based on the number of response selection parameters and based on the number of different topics or products within the tax return preparation system 111. As the number of response selection parameters increase, the complexity of the function of the experience decision engine 114 also increases. Because the experience decision engine 114 evaluates the question content 121, other response selection parameters, and the products available from the service provider in order to match a response to a question, the number of possible combinations of unique questions and responses can be in the thousands, tens of thousands, or millions, according to various embodiments. As a result, as the number of response selection parameters, available responses, and types of unique questions increase, the experience decision engine 114 provides significantly faster (e.g., immediate) question responses to a user than would be conceivably possible by a tax return preparation specialist, according to one embodiment.

In one embodiment, the experience decision engine 114 utilizes regular logic expressions to analyze received questions and to determine which category of responses the question is associated with. Each category represents a set or group of question responses (e.g., template responses) that are similarly related in a data organizational structure (e.g., a data tree), according to one embodiment. Examples of categories include, but are not limited to, print tax return for current year, amend tax return for current year, and electronic file ("e-file") status of tax return, according to one embodiment.

In one embodiment, the tax return preparation system 111 receives feedback from the user and quantifies the effectiveness of the analysis performed by the tax return preparation system, based on the received feedback. For example, the tax return preparation system 111 is configured to ask whether the user is satisfied with each question response 123 that is delivered to the user, according to one embodiment.

According to one embodiment the experience decision engine 114 repeatedly applies rules, logic, and/or filters to the question content 121 to direct a user's question to one of a number of predetermined question response templates 124. In one embodiment, a question response template 124 includes a sequence of user interfaces configured to gather additional information from the user and guide the user to a personalized question response 123. In some embodiments, the question response 123 includes notifying the user that the user needs to wait for additional correspondence from the IRS while the user's tax return filing is being processed.

In one embodiment, the experience decision engine 114 uses the information that has been acquired from the user to provide assistance to the user before assistance is requested by the user. For example, after providing a first question response for a question, the tax return preparation system can be configured to direct the user to a second question response, response category, or topic that succeeds the user's present question/response/task, according to one embodiment. By presenting the user with a next logical question response, the experience decision engine 114 preemptively provides assistance (e.g., before the assistance has even been requested), to improve the user's experience with the tax return preparation system 111, according to one embodiment.

In one embodiment, the tax return preparation system 111 or the experience decision engine 114 prioritizes the tax topics within the tax return preparation system 111 by relevance to the user. The tax return preparation system 111 or the experience decision engine 114 prioritizes the tax topics based on one or more of the user data 118, the question content 121, and the user analytics 122, according to one embodiment. The experience decision engine 114 then evaluates the question content 121, the user data 118, the user analytics 122, and/or available question response templates 124 in combination with the prioritized tax topics, to generate a question response 123 that is personalized to a particular user, according to one embodiment.

According to one embodiment, applying the techniques described above, the tax return preparation system 111 advantageously generates more satisfactory question responses than traditional tax return preparation systems, without having to handcraft responses to every possible permutation of questions that might arise in the course of the tax return preparation interview.

Process

Figure 2:
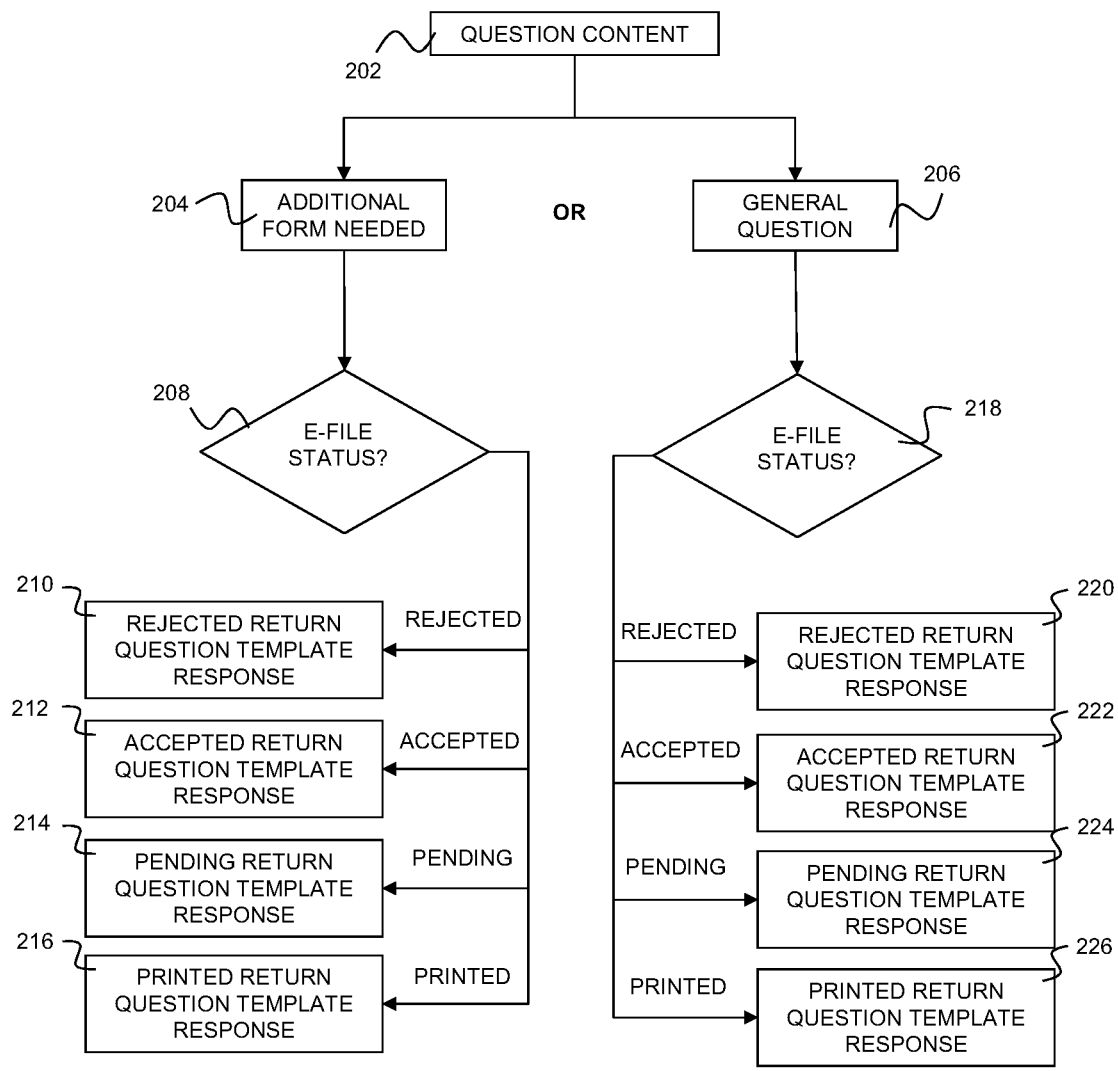
FIG. 2 is a flow diagram of a process for pairing question content with one of a number of template responses, in accordance with one embodiment.

FIG. 2 illustrates a flow diagram of a process 200 for pairing question content with one of a number of template responses, according to one embodiment. In one embodiment, the process 200 is a flow diagram for a category of amending tax returns.

At block 202, the process receives question content, according to one embodiment. The question content includes a tax-related question that has been submitted by a user, or includes phrases, terms, or words from a tax-related question that has been submitted by a user, according to one embodiment. If the process determines, based on the question content, that the topic of the question content results in an additional form being needed, the process proceeds to block 204, according to one embodiment. If the process determines, based on the question content, that the topic of the question content is a general question within a category, the process proceeds to block 206, according to one embodiment.

At block 208, the process determines the e-file status of the tax return for the user that submitted the question content, according to one embodiment. In this particular example embodiment, the e-file status is one of four options, which include: rejected, accepted, pending, and printed. If the process determines that the e-file status of the tax return for the user is rejected, the process proceeds to block 210, according to one embodiment. If the process determines that the e-file status of the tax return for the user is accepted, the process proceeds to block 212, according to one embodiment. If the process determines that the e-file status of the tax return for the user is pending, the process proceeds to block 214, according to one embodiment. If the process determines that the e-file status of the tax return for the user is printed, the process proceeds to block 216, according to one embodiment.

At block 218, the process determines the e-file status of the tax return for the user that submitted the question content, according to one embodiment. In this particular example embodiment, the e-file status is one of four options, which include: rejected, accepted, pending, and printed. If the process determines that the e-file status of the tax return for the user is rejected, the process proceeds to block 220, according to one embodiment. If the process determines that the e-file status of the tax return for the user is accepted, the process proceeds to block 222, according to one embodiment. If the process determines that the e-file status of the tax return for the user is pending, the process proceeds to block 224, according to one embodiment. If the process determines that the e-file status of the tax return for the user is printed, the process proceeds to block 226, according to one embodiment.

Each of the question template responses are representative of one or more template responses that the experience decision engine 114 is capable of choosing from for delivery to the user as a question response 123, according to one embodiment. While the process 200 illustrates eight possible question template responses, in other processes or logic sequences, tens, hundreds, thousands, or more individual question template responses may be available for the experience decision engine 114 to match to a particular question content, according to one embodiment.

Although a particular sequence is described herein for the execution of the process 200, other sequences can also be implemented, according to other embodiments.

Figure 3:
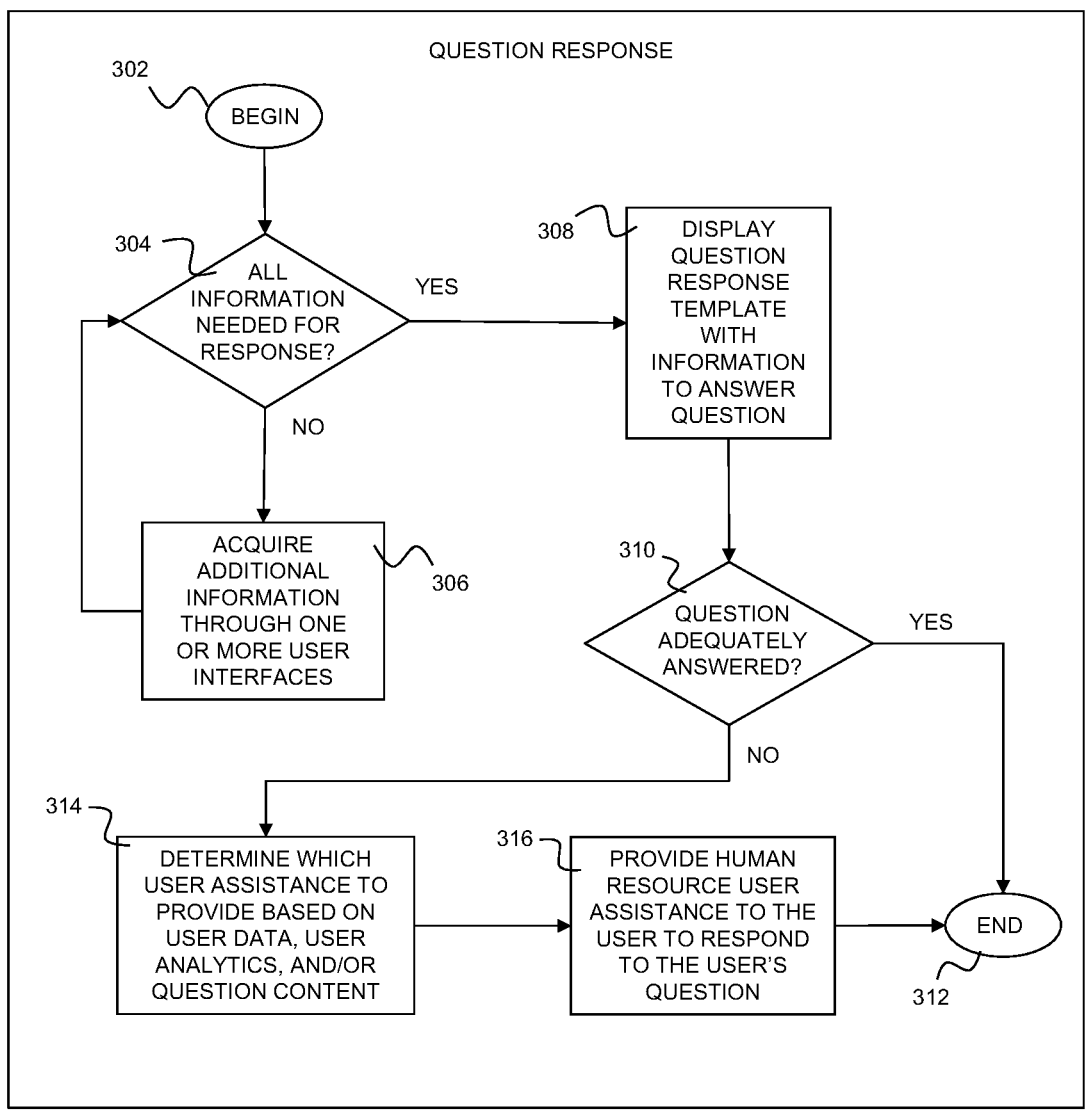
FIG. 3 is a flow diagram of a process for providing a question response to a user with a tax return preparation system, in accordance with one embodiment.

FIG. 3 illustrates a flow diagram of a process 300 for providing a question response to a user by a tax return preparation system, in response to receiving a tax-related question from the user, according to one embodiment.

At block 302, the process begins.

At block 304, the process determines if all information needed for a response has been obtained, according to one embodiment. If all information needed for a response has not been obtained, the process proceeds to block 306, and if all information needed for response has been obtained, the process proceeds to block 308, according to one embodiment.

At block 306, the process acquires additional information through one or more user interfaces, according to one embodiment.

At block 308, the process displays a question response template with information to answer a question, according to one embodiment. The question response template includes, but is not limited to, user data, question content, user analytics, knowledge content, and the like, according to one embodiment.

At block 310, the process determines if the question was adequately answered, according to one embodiment. The process determines whether the question was adequately answered by querying the user, according to one embodiment. If the user indicates that the question was adequately answered, the process proceeds to block 312 and ends, according to one embodiment. If the user indicates that the question was inadequately answered, the process proceeds to block 314, according to one embodiment.

At block 314, the process determines which user assistance to provide based on user data, user analytics, and/or question content, according to one embodiment. The user analytics may provide insights as to what part of the tax return preparation process is unclear to the user, according to one embodiment. The user data may also provide insights as to what part of the tax return preparation process is unclear to the user, according to one embodiment.

At block 316, the process provides human resource user assistance to the user to respond to the user's question, according to one embodiment. Human resource user assistance can include, but is not limited to, a telephone call, a videoconference, and a web-based chat or chat room, according to one embodiment. Upon completion of block 316, the process proceeds to block 312 and ends, according to one embodiment.

Although the process 300 describes providing user assistance after displaying a question response template to the user, in some embodiments, the process 300 may bypass displaying a question response template and may initially provide user assistance to respond to a user's question.

Figure 4:
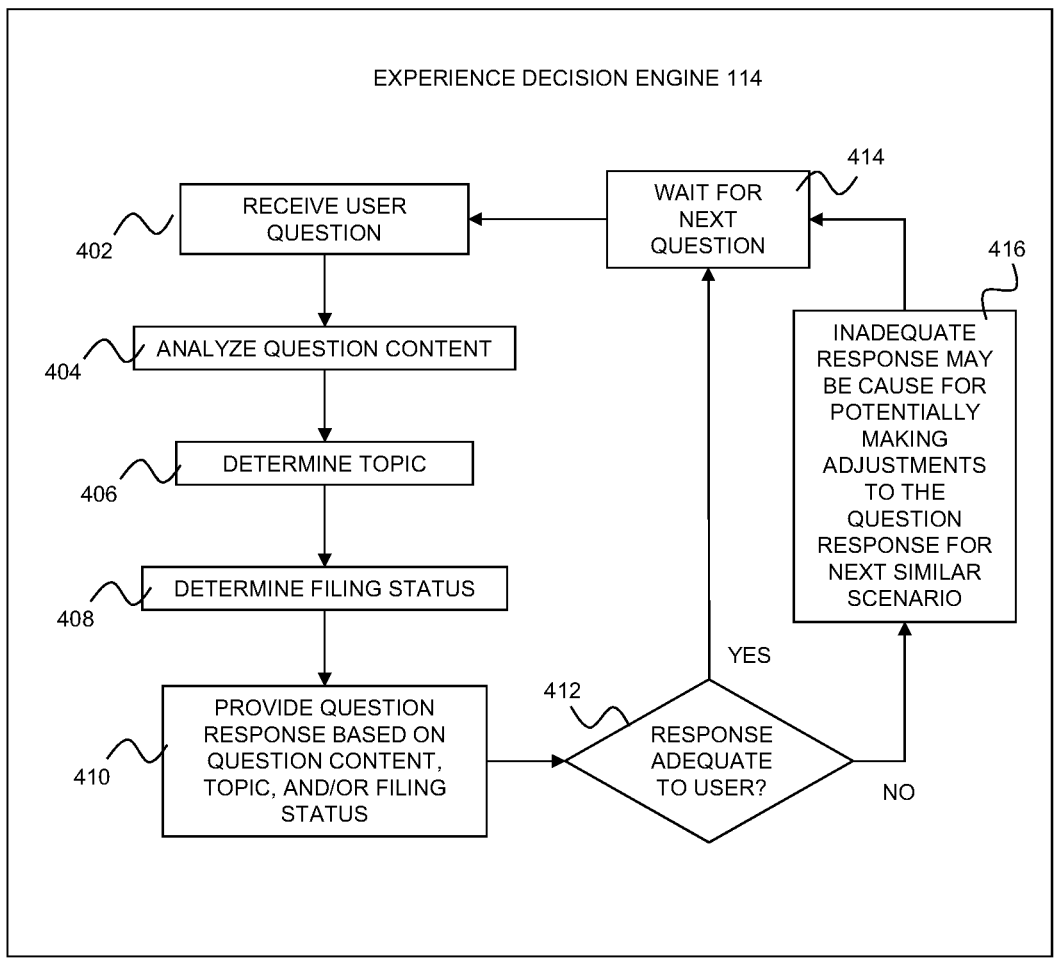
FIG. 4 is a flow diagram of a process for operating an experience decision engine within an electronic tax return preparation system, in accordance with one embodiment.

FIG. 4 illustrates a flow diagram of a process 400 for operating an experience decision engine within an electronic tax return preparation system that is configured to provide personalized question responses to users who submit tax-related questions to the electronic tax return preparation system, according to one embodiment.

At block 402, the experience decision engine 114 receives a user question, according to one embodiment.

At block 404, the experience decision engine 114 analyzes the question content to determine the relevant or substantive phrases, terms, and/or words of the question, according to one embodiment.

At block 406, the experience decision engine 114 determines the topic that is associated with the received user question, according to one embodiment.

At block 408, the experience decision engine 114 determines a filing status of the tax return for the user, according to one embodiment. The experience decision engine 114 or another component of the tax return preparation system 111 may be configured to query one or more internal revenue service ("IRS") databases or systems to determine the filing status of the user's tax return, according to one embodiment. In another embodiment, the experience decision engine 114 queries the user to determine the filing status of the user's tax return.

At block 410, the experience decision engine 114 provides a question response to the user based on the question content, the topic, and/or the filing status of the user's tax return, according to one embodiment.

At block 412, the experience decision engine 114 determines whether the question response was adequate to the user, according to one embodiment. If the response is adequate to the user, the experience decision engine 114 proceeds to block 414 where the experience decision engine 114 waits for the next question, according to one embodiment. If the response is inadequate to the user, the experience decision engine 114 proceeds to block 416, according to one embodiment.

At block 416, the experience decision engine 114 notes that the inadequate response may be cause for potentially making adjustments to the question response for the next similar scenario, according to one embodiment. By employing a feedback system, the experience decision engine 114 improves its quality of service to the users over time, according to one embodiment.

Figure 5:
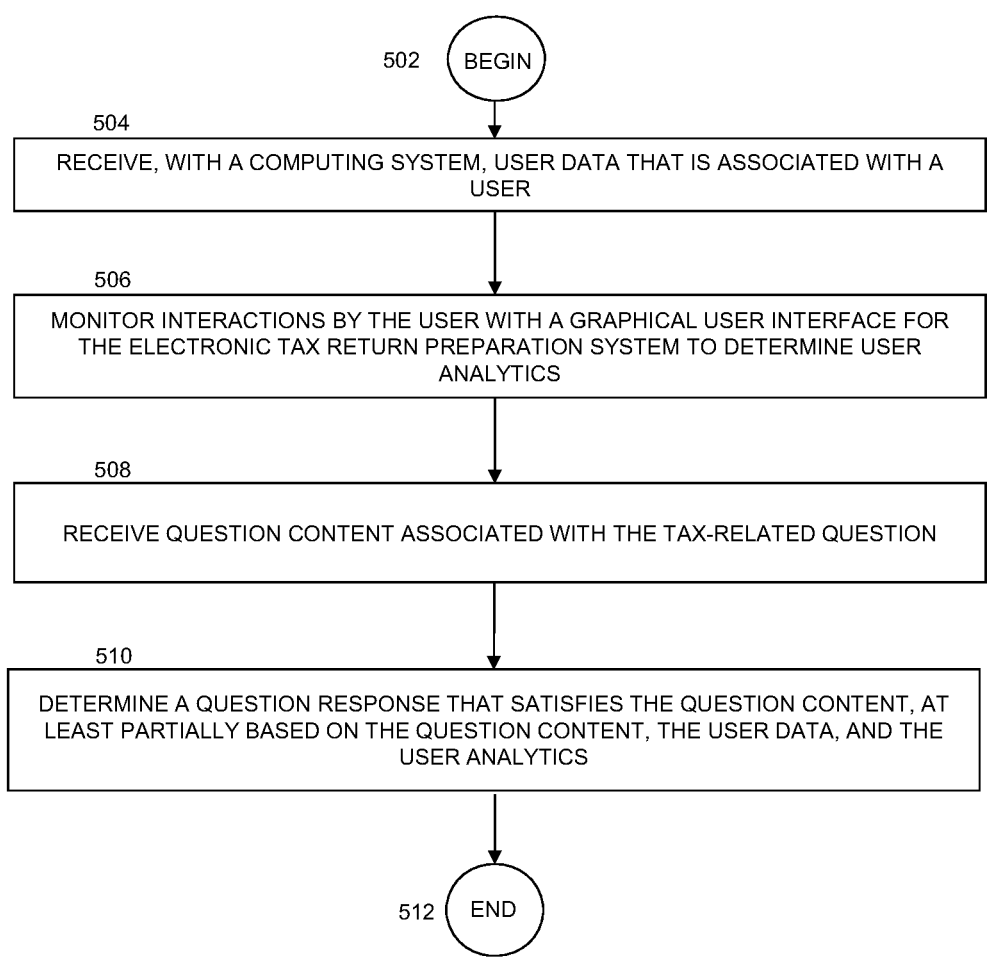
FIG. 5 is a flow diagram of a process for providing a personalized question response to a tax-related question, in accordance with one embodiment.

FIG. 5 illustrates a flow diagram of a process 500 for providing a personalized question response to a tax-related question that is received from a user of an electronic tax return preparation system, according to one embodiment.

At block 502, the process begins.

At block 504, the process receives, with a computing system, user data that is associated with a user, according to one embodiment.

At block 506, the process monitors interactions by the user with a graphical user interface for the electronic tax return preparation system to determine user analytics, according to one embodiment.

At block 508, the process receives question content associated with the tax-related question, according to one embodiment. The tax-related question is submitted to the electronic tax return preparation system by the user, according to one embodiment.

At block 510, the process determines a question response that satisfies the question content, at least partially based on the question content, the user data, and the user analytics, according to one embodiment.

At block 512, the process ends.

As noted above, the specific illustrative examples discussed above are but illustrative examples of implementations of embodiments of the method or process for individualizing the tax return preparation interview with an interchangeable, e.g., modular, analytics module. Those of skill in the art will readily recognize that other implementations and embodiments are possible. Therefore the discussion above should not be construed as a limitation on the claims provided below.

In accordance with an embodiment, a computing system implemented method provides a personalized question response to a tax-related question that is received from a user of an electronic tax return preparation system. The method includes receiving, with a computing system, user data that is associated with the user of the electronic tax return preparation system, according to one embodiment. The method includes monitoring interactions between the user and a user interface of the electronic tax return preparation system to determine user analytics, according to one embodiment. The user analytics represent a behavior of the user while interacting with the user interface of the electronic tax return preparation system, according to one embodiment. The method includes receiving a tax-related question having question content, according to one embodiment. The tax-related question is submitted to the electronic tax return preparation system by the user, according to one embodiment. The method includes determining a question response that satisfies the tax-related question, and determining the question response is at least partially based on the question content, the user data, and the user analytics, according to one embodiment. The method includes providing the question response to the user through the user interface, according to one embodiment.

In accordance with an embodiment, a computer-readable medium has a plurality of computer-executable instructions which, when executed by a processor, perform a method for providing a personalized question response to a tax-related question that is received from a user with an electronic tax return preparation system. The instructions include a tax return preparation engine configured to receive a tax-related question from a user and configured to provide a question response to the user, according to one embodiment. The question response resolves the tax-related question, and the tax-related question includes question content, according to one embodiment. The tax return preparation engine is configured to receive user data and receive user analytics, and the user analytics include behavior of the user while the user interacts with the electronic tax return preparation system, according to one embodiment. The instructions include an experience decision engine configured to generate the question response based at least partially on the question content, the user data, and the user analytics, according to one embodiment.

In accordance with an embodiment, a system provides a personalized question response to a tax-related question that is received from a user of an electronic tax return preparation system. The system includes at least one processor, and at least one memory coupled to the at least one processor, according to one embodiment. The at least one memory stores instructions which, when executed by any set of the one or more processors, perform a process for providing a personalized question response to a tax-related question that is received from a user of an electronic tax return preparation system, according to one embodiment. The process includes receiving, with a computing system, user data that is associated with the user of the electronic tax return preparation system, according to one embodiment. The process includes monitoring interactions between the user and a user interface of the electronic tax return preparation system to determine user analytics, according to one embodiment. The user analytics represent a behavior of the user while interacting with the user interface of the electronic tax return preparation system, according to one embodiment. The process includes receiving a tax-related question having question content, according to one embodiment. The tax-related question is submitted to the electronic tax return preparation system by the user, according to one embodiment. The process includes determining a question response that satisfies the tax-related question, and determining the question response is at least partially based on the question content, the user data, and the user analytics, according to one embodiment. The process includes providing the question response to the user through the user interface, according to one embodiment.

By minimizing, or potentially eliminating, the processing and presentation of irrelevant question responses to a user, implementation of embodiments of the present disclosure allows for significant improvement to the field of data collection and data processing. As one illustrative example, by minimizing, or potentially eliminating, the processing and presentation of irrelevant question responses to a user, implementation of embodiments of the present disclosure allows for relevant data collection using fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems. Therefore, implementation of embodiments of the present disclosure amount to significantly more than an abstract idea and also provide several improvements to multiple technical fields.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing a personalized question response to a tax-related question that is received from a user of an electronic tax return preparation system, comprising:

receiving, with a computing system, user data that is associated with the user of the electronic tax return preparation system;

monitoring interactions between the user and a user interface of the electronic tax return preparation system to determine user analytics, wherein the user analytics represent a behavior of the user while interacting with the user interface of the electronic tax return preparation system, the user analytics including at least mouse-over data, durations for entering responses to questions and navigation history between webpages;

receiving a tax-related question having question content, wherein the tax-related question is submitted to the electronic tax return preparation system by the user;

parsing the question content into phrases, terms, and other words that represent a substantive purpose of the question;

selecting, from a plurality of predetermined question response templates, a question response template to use for delivering a personalized question response to the user, wherein the question response template is selected at least partially based on the parsed question content, the user data, the user's tax filing status, and the user analytics including consideration of at least mouse-over data, durations for entering responses to questions and navigation history between webpages;

determining a personalized question response that satisfies the tax-related question;

populating the selected question response template with data representing the personalized question response, the personalized question response data including user data, user's tax filing status, question content, instructions, and crowd source responses to similar questions, resulting in a populated personalized question response template;

in response to the question content being parsed, automatically establishing a communication link between a human support person and the user;

providing the populated personalized question response template to the user through the user interface;

determining that the question was not answered to a satisfaction of the user; and adjusting, responsive to the determination that the question was not answered to a satisfaction of the user, a future question response for a next similar question.

2. The method of claim 1, wherein the question response includes one or more question response templates, wherein each of the one or more question response templates is related to a particular category of questions.

3. The method of claim 2, wherein the one or more question response templates display the question content; at least some of the user data; at least some of the user analytics; and a specific data, a mailing address, a website address, an instruction, or a notice that addresses the tax-related question of the user.

4. The method of claim 2, wherein the one or more question response templates provide crowd source responses that were generated to respond to similar questions as the tax-related question of the user, wherein the one or more question response templates provide instructional publications that address the tax-related question of the user and that are prepared by tax professionals.

5. A system for providing a personalized question response to a tax-related question that is received from a user of an electronic tax return preparation system, the system comprising:

at least one processor; and at least one memory coupled to the at least one processor, the at least one memory having stored therein instructions which, when executed by any set of the at least one processors, perform a process including:

receiving, with a computing system, user data that is associated with the user of the electronic tax return preparation system;

monitoring interactions between the user and a user interface of the electronic tax return preparation system to determine user analytics, wherein the user analytics represent a behavior of the user while interacting with the user interface of the electronic tax return preparation system, the user analytics including at least mouse-over data, durations for entering responses to questions and navigation history between webpages;

receiving a tax-related question having question content, wherein the tax-related question is submitted to the electronic tax return preparation system by the user;

parsing the question content into phrases, terms, and other words that represent a substantive purpose of the question;

selecting, from a plurality of predetermined question response templates, a question response template to use for delivering a personalized question response to the user, wherein the question response template is selected at least partially based on the parsed question content, the user data, the user's tax filing status, and the user analytics including consideration of at least mouse-over data, durations for entering responses to questions and navigation history between webpages;

determining a personalized question response that satisfies the tax-related question;

populating the selected question response template with data representing the personalized question response, the personalized question response data including user data, user's tax filing status, question content, instructions, and crowd source responses to similar questions, resulting in a populated personalized question response template;

in response to the question content being parsed, automatically establishing a communication link between a human support person and the user;

providing the populated personalized question response template to the user through the user interface; and providing the question response to the user through the user interface.

6. The system of claim 5, wherein the question response includes one or more question response templates, wherein each of the one or more question response templates is related to a particular category of questions.

7. The system of claim 6, wherein the one or more question response templates display the question content; at least some of the user data; at least some of the user analytics; and a specific data, a mailing address, a website address, an instruction, or a notice that addresses the tax-related question of the user.

8. The system of claim 6, wherein the one or more question response templates provide crowd source responses that were generated to respond to similar questions as the tax-related question of the user, wherein the one or more question response templates provide instructional publications that address the tax-related question of the user and that are prepared by tax professionals.

\* \* \* \* \*